Dec. 3, 1940.   R. J. LEVY   2,223,630
APPARATUS FOR PRODUCING STEREOSCOPIC PICTURES
Filed Dec. 12, 1938
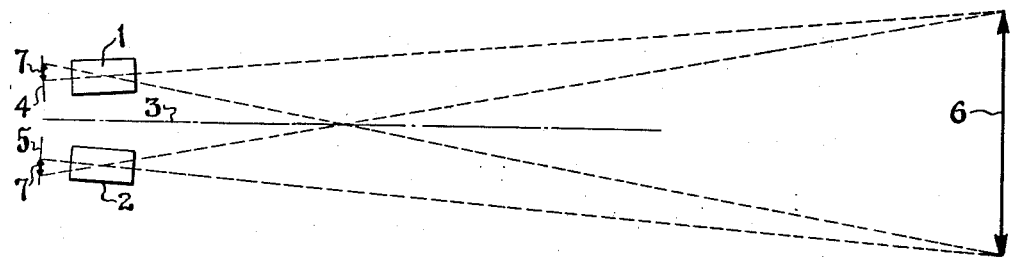
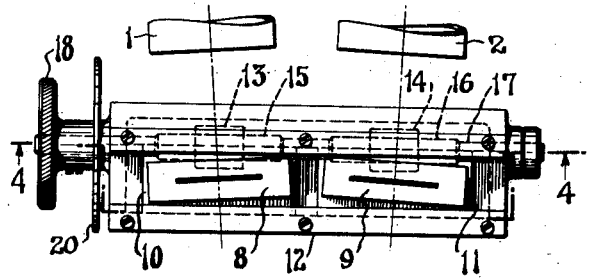
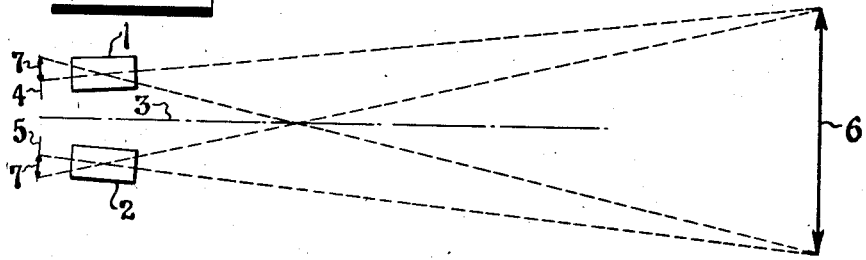
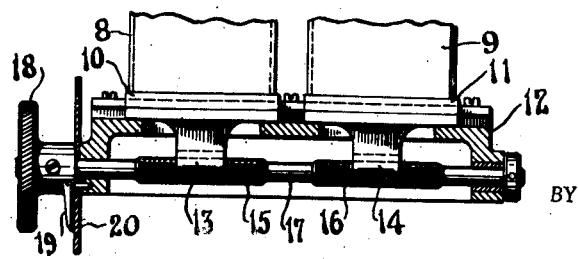
INVENTOR.
Roman J. Levy
BY
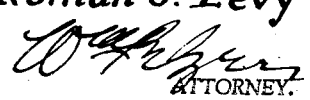
ATTORNEY.

Patented Dec. 3, 1940

2,223,630

UNITED STATES PATENT OFFICE 2,223,630

APPARATUS FOR PRODUCING STEREOSCOPIC PICTURES

Roman J. Levy, New York, N. Y.

Application December 12, 1938, Serial No. 245,062

1 Claim. (Cl. 88—16.6)

This invention relates to an apparatus for producing stereoscopic pictures, and more particularly to motion pictures having stereoscopic effect, and to means for projecting such pictures in superposed position on a screen for viewing without the use of supplementary equipment positioned between the eyes of the observer and the picture on the screen.

My experimental work has developed that the right and left eyes of persons of normal vision have steady visual axes and that the long axis of one eye is different from that of the other eye in that the long axis of the right eye extends divergently to the right, whilst the long axis of the left eye extends to the left, thus causing a diverged vision, the degree of divergence of the two axes having an included angle in the horizontal plane of approximately six to nine degrees. Furthermore, I have ascertained that the long axis of the left eye is directed slightly downward, whilst the long axis of the right eye inclines upwardly, and that the direction of the long axes in both planes remain steady so long as both eyes are simultaneously active.

As hereinafter pointed out in detail, the principles of my invention require the embodiment in a camera of the following:

1. The setting of a pair of lenses with axes diverging equally from the central line of the camera in the horizontal plane, the included angle being approximately six to nine degrees, and the lenses preferably diverging in the vertical plane at slightly different angles.

2. The placement of the light sensitive surface or film on which the right and left images are projected, or two separate such surfaces, perpendicular to the axes of the lenses.

3. Maintaining the axial relation of the lenses fixed for all focal lengths and distances between the object and lenses.

4. Adjusting means for the two exposure surfaces for adjusting the two adjacent sections equally and simultaneously across the axes of the respective lenses in opposite directions relative to the objective distance, that is, the distance between the object and the optical centers of the lens systems for which the camera is positioned.

In projecting the stereoscopic pictures produced in accordance with my invention the axial centers of the two projector lenses will be set with the same degree of divergence as in the camera and maintained in such angular relation, and the pictures will occupy the same relative position to the lenses as in the camera.

The principle of my invention is illustrated in the accompanying drawing in which—

Figure 1 is a schematic view illustrating two lens barrels of a camera or projector set at diverging angles and the relative positions of the light sensitive surfaces with an object indicated at a given distance from the camera or optical centers of the lenses.

Figure 2 a similar view with the object indicated at a point nearer to the camera.

Figure 3 a detail view of a slide and adjusting screw for adjusting the light sensitive surfaces or films passing through film gates toward and away from the center line of the camera, and Figure 4 a longitudinal vertical section on the line 4—4 of Figure 3.

Referring to the drawing, I and 2 indicate a pair of lens barrels having similar lens systems of any suitable type, and having a definite angular setting diverging outward relative to the center line of the camera. The axial centers of the lens systems diverge at like angles from the center line 3 of the camera to present an included angle of approximately six to nine degrees. The light sensitive surfaces or films are indicated at 4 and 5 and these surfaces are positioned in the camera to present an exposure surface to each lens perpendicular to the axes of the lenses 1—2, respectively, and preferably at fixed focal length with respect to the lenses. The object to be photographed is represented by the arrow 6 at a given distance from the camera, and it will be observed that the two images 7 are formed on the surfaces 4—5 at equal distances from the center line 3. As the objective distance is changed by positioning the camera further away from or nearer to the object, the images will be projected onto the surfaces 4—5 more or less nearer to the center line of the camera proportionately to the objective distance. Thus in Figure 2 where the object is shown nearer to the camera the images 7 on the surfaces 4—5 appear further to the left and right, respectively, than in Figure 1.

To maintain the two images in uniformly spaced position on the film relative to the center line of the camera for different objective distances, the films are moved laterally, and for this purpose the film gates 8 and 9 are mounted on slide blocks 10 and 11 as illustrated in Figures 3 and 4. The film gates are set on these blocks at the proper angle to guide and maintain the films in a plane perpendicular to the axes of the lenses and in fixed focal position. Blocks 10—11 slide laterally of the camera in a support 12 which is slotted on the underside and through which slot arms 13 and 14 project from the blocks 10 and 11 respectively. Arms 13—14 are provided with left and right screw-threads, respectively, for left and right screw-threads 15 and 16, respectively, on the adjusting rod 17 which has a knob 18 by which the rod is turned the desired degree in either direction to adjust the blocks and film guides toward or away from the center line. In practice the knob will be provided with a pointer 19 which co-operates with a suitable dial 20 having graduations indicating the distance between the object and camera for which the films are adjusted laterally with respect to the lens axes.

In projecting pictures taken with a camera constructed in accordance with the principles of my invention to superpose the pictures on a screen and produce the stereoscopic or three-dimensional effect, the projector lens barrels will be set with the same spacing and angular relation as in the camera, and since the images on the film will have been centered laterally by the lateral adjustment of the films in the camera, the successive images will follow in straight line sequence, and no adjustments of the projector lenses or films to effect superposing of the images on the screen will be necessary other than the usual axial adjustment of both lens barrels uniformly to provide the desired sharpness of image on the screen.

The structural details of a camera and projector are not shown, but it will be understood that in the camera the usual stops, shutter and film holding and feeding mechanism will be employed, except that for either still pictures or motion pictures, the lens barrels will be supported and held in fixed angular relation and that the film holders or aperture gates in motion picture cameras will be laterally adjustable as and for the purpose above described. And it will also be understood that in a projector the usual lens systems, film feeding mechanism and light source will be provided, except that the pair of lens barrels will be held in the same fixed angular relation as in the camera.

What I claim is:

A device for photographically producing stereoscopic pictures including a camera having a pair of objectives, means to support the objectives with their axes in the same horizontal plane and diverging slightly in like angles from the center line of the camera, a guide at the focal plane of the lens at right angles to the said camera axes, a film gate for each lens, means to support the film gates in the guide with the films at right angles to the axis of the corresponding lens, and means to adjust the supporting means in the guide to and from each other.

ROMAN J. LEVY.